April 14, 1970  HANS-GEORG WASCHULEWSKI ET AL  3,505,885

VIBRATION GENERATORS

Filed March 12, 1968 5 Sheets-Sheet 1

INVENTORS:
Hans Bäumers
Hans Reinhart Janbitz
Hans-Georg Waschulewski
BY
Darbo. Robertson Vandenbergh.
attys.

April 14, 1970    HANS-GEORG WASCHULEWSKI ET AL    3,505,885
VIBRATION GENERATORS
Filed March 12, 1968    5 Sheets-Sheet 2

INVENTORS:
Hans Bäumers
Hans Reinhart Lambertz
Hans-Georg Waschulewski
BY
Darby, Roberts & Vandenburgh,
attys.

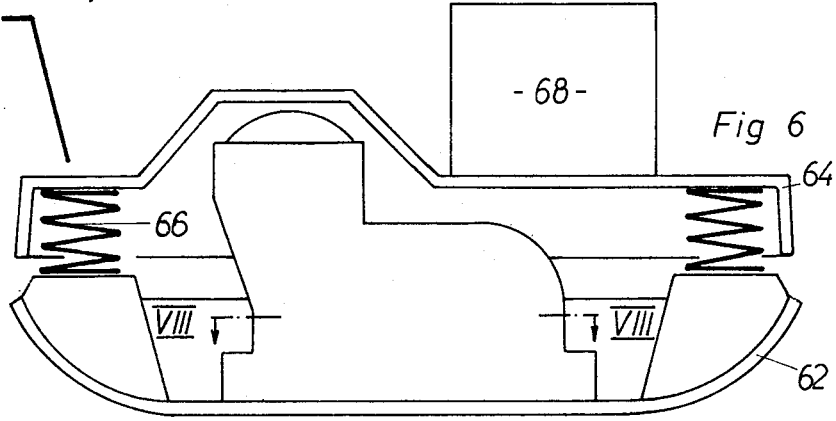
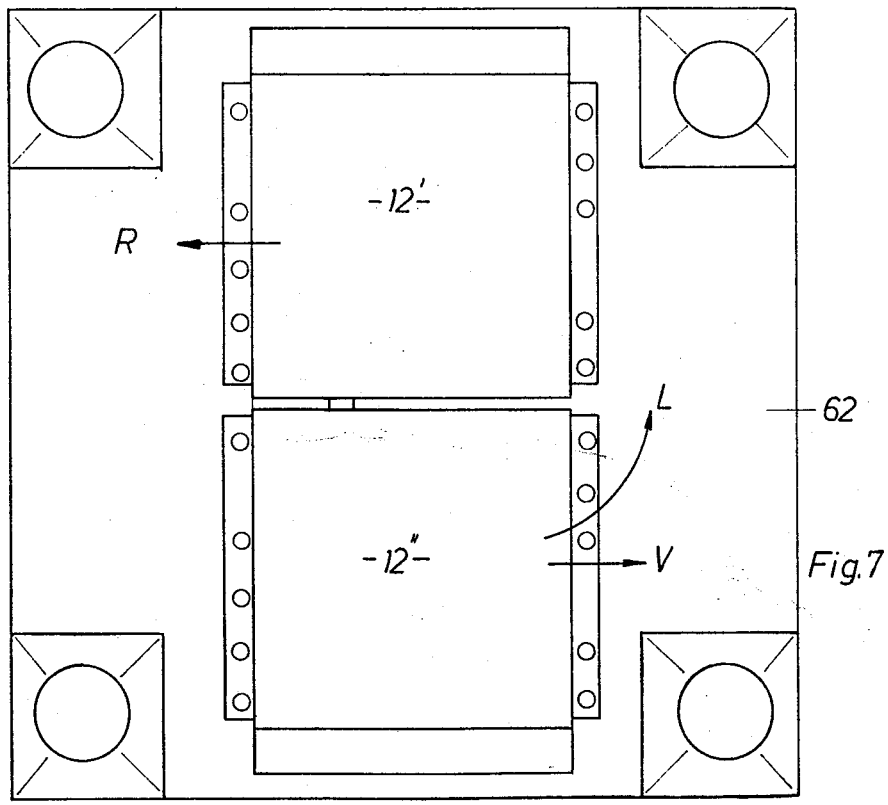

United States Patent Office 3,505,885
Patented Apr. 14, 1970

3,505,885
VIBRATION GENERATORS
Hans-Georg Waschulewski, Dusseldorf, Hans Bäumers, Dusseldorf-Gerresheim, and Hans Reinhart Lambertz, Kaarst, Germany, assignors to Losenhausen Maschinenbau Aktiengesellschaft, Dusseldorf-Grafenberg, Germany
Filed Mar. 12, 1968, Ser. No. 712,549
Int. Cl. F16h 33/20
U.S. Cl. 74—61                                                     3 Claims

ABSTRACT OF THE DISCLOSURE

A vibration generator constructed as directional vibrator with variable vibration orientation, has two counter-rotating unbalances in transmissive coupling with each other via a dog clutch which can be engaged in a plurality of clutch positions and can be indexed by definite angular amounts. One dog of said dog clutch is moved simultaneously into the path of a stop which corresponds to an adjacent clutch position when said dog clutch is disengaged from one clutch position. Said dog clutch is adapted to bear on said stop after the unbalance on the outward side is decelerated relative to the counter-rotating unbalance on the input side.

BACKGROUND OF THE INVENTION

Figure 1:
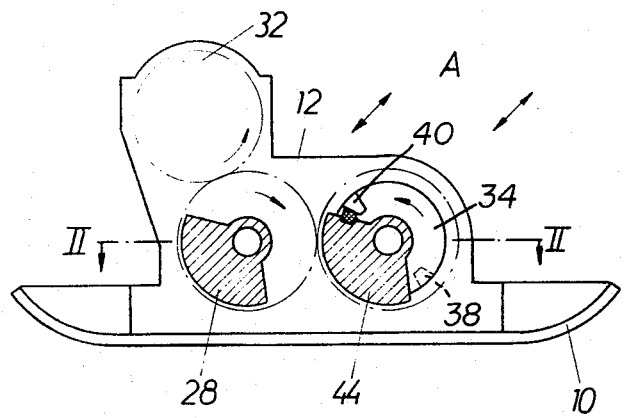

A vibration generator of the kind heretofore described has been disclosed in the Swiss patent specification 349,-932. This relates to a soil compactor with a bottom plate, on which the vibration generator is mounted, bearing on the ground.

A load, represented substantially by the motor, is supported via springs on the bottom plate. The vibration generator is provided in a housing with two shafts, disposed horizontally adjacent and parallel to each other, on which the unbalances are mounted. One of the shafts is in transmissive connection with the motor. The two shafts are coupled to each other by means of two gearwheels. One of the gearwheels is of relatively long length and is fixedly mounted on one shaft. The other gearwheel is loose and is disposed on the other shaft between stops and is adapted to be axially slidable on said shaft. It is provided on both sides with drivers which bear on abutments of the stop members at different angular clutch positions so that axial displacement of the gearwheel from one limiting position into another is accompanied by slip and one driver enters the path of the associated abutment before the other abutment is released by the other driver. Reciprocal indexing of the slidable gearwheel, either once or repeatedly, enables the mutual angular position of the counter-rotating shafts to be varied in steps. The unbalances, which counter-rotate relative to the shafts, produce orientated vibrations. The centrifugal forces cancel each other in one plane while they are added to each other in a plane perpendicularly thereto. The afore-mentioned vibration plane is pivoted together with a change of the mutual angular position of the shafts and unbalances.

In the known soil compactor the horizontal component of the orientated viibration produces a feed motion for the soil compactor over the ground which is to be consolidated while the vertical component serves to induce vibrations into the ground. The feed rate and/or direction may be changed by appropriate changing of the vibration orientation.

The known apparatus refer to a ground consolidator constructed as "plate vibrator." The change of vibration orientation described hereabove of vibration generators constructed as directional vibrators may however also be applied in another context, for example for vibratory screens.

The known system described heretofore assumes that some slip takes place after changing over of the gearwheel, that is to say after the driver is disengaged from the corresponding abutment of one stop member. That shaft of the vibration generator which is not directly driven must lag so that the driver bears on the opposite side of the gearwheel upon the abutment of the other stop member, offset at an angle. Generally, this will readily occur since the shaft is only driven by the dog clutch and the transmissive connection is initially interrupted until the dog bears upon the next abutment. However, self-synchronization of the unbalances may occur particularly if the vibrating system is in resonance with the vibration generator. No additional mutual rotation of the unbalances will then take place but the vibration plane of the system will tend to retain its position.

The object of the invention is to avoid the aforementioned self-synchronization of vibration generators of the kind heretofore described. According to the invention the unbalance on the outward side is provided with a brake which is automatically applied only during the indexing motion.

A brake, which prevents self-synchronization and ensures thtat the dog clutch bears on the angularly offset clutch or driving position is adapted to act briefly upon the output side shaft during indexing of the dog clutch from one clutch position to the next.

The invention may be performed in that the unbalances are mounted in known manner on shafts disposed in parallel to each other and being coupled to each other by gearwheels, one of which, adapted to function as a dog clutch is arranged to slide loosely, axially and reciprocatingly between stop members on one of the shafts and being provided on both sides with drivers of which one extends into the path of one of the aforementioned stop members, the brake being a disc brake in which a brake support is thrust by the brake operating disc via inclined surfaces which are mounted on the unbalance shaft, said thrusting motion occurring during rotation of one side as well as during rotation of the other side, a mechanism for the axial displacement of the gearwheel being coupled to a brake-operating mechanism which is adapted to act non-positively on the brake-operating disc to drive same temporarily from its middle position into one or the other direction during each indexing motion.

Figure 2:
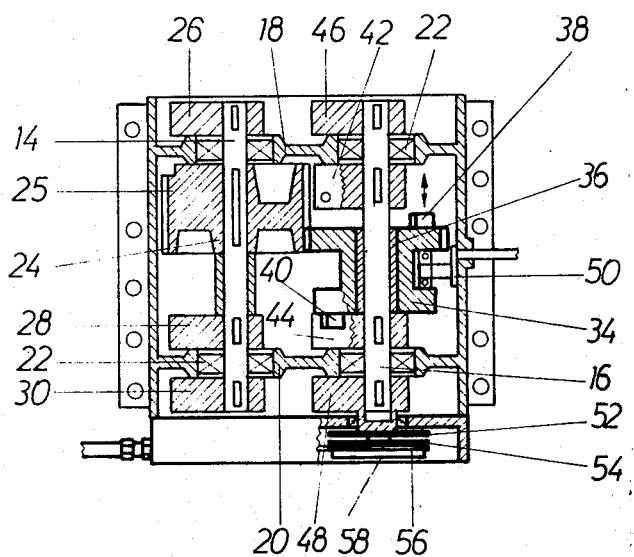
Figure 4:
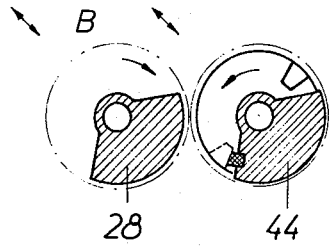
Figure 3:
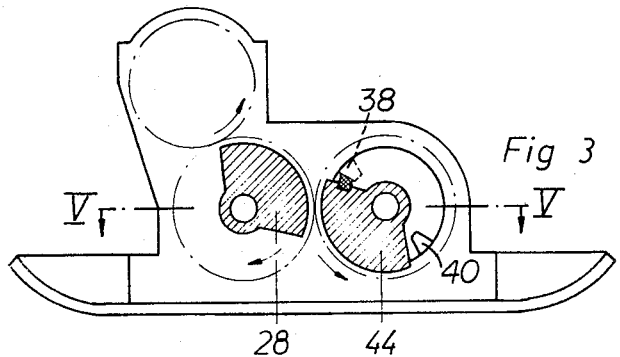
Figure 5:
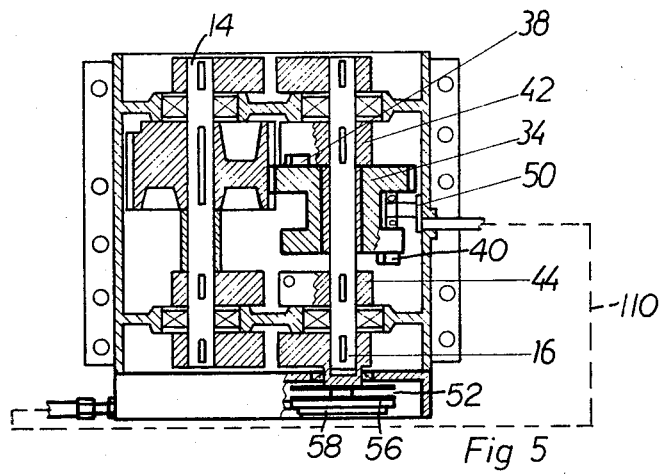
Figure 8:
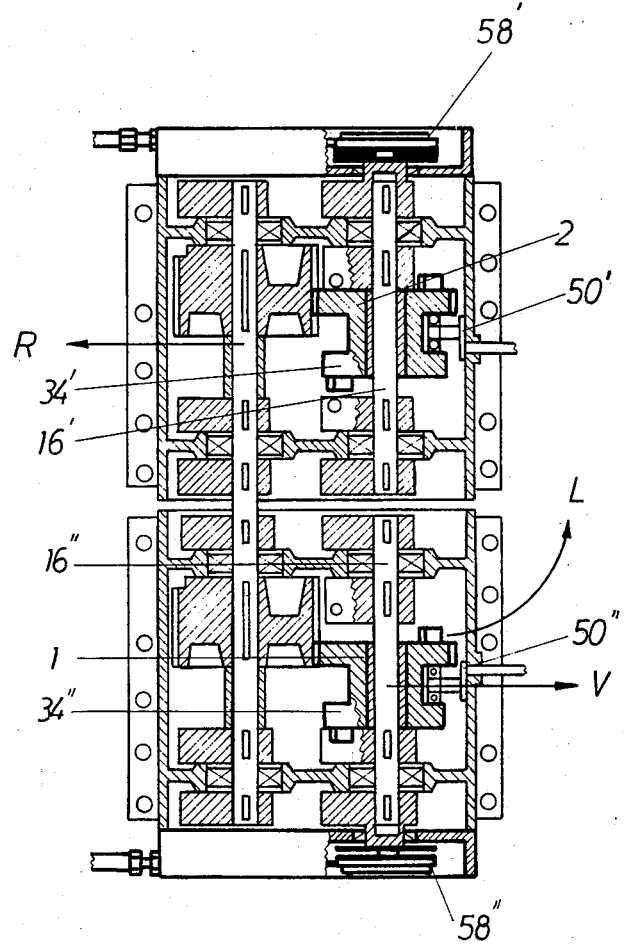
Figure 9:
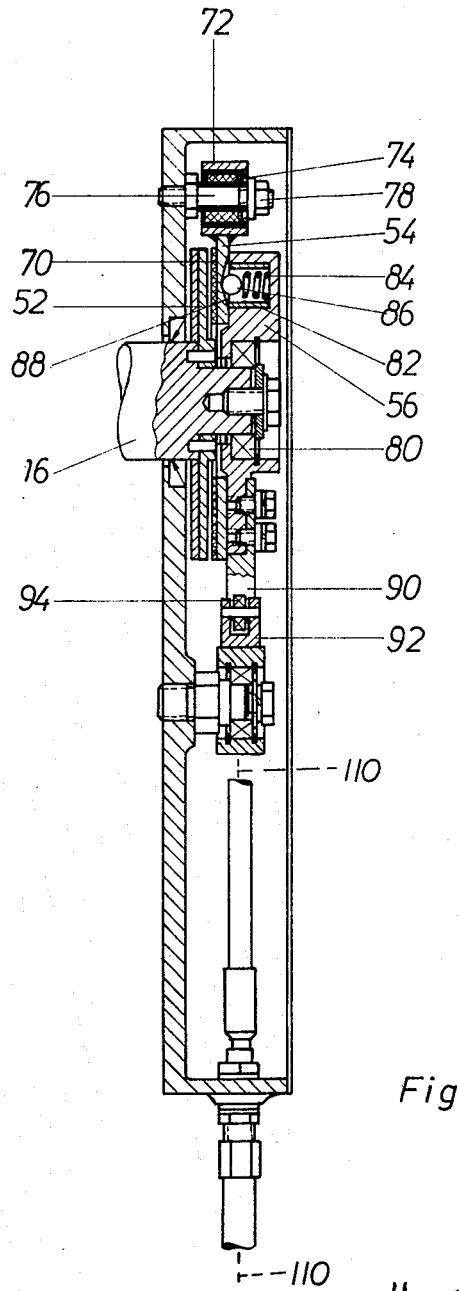

Embodiments of the invention will now be described by way of example with reference to the accompanying drawings in which:

FIGURE 1 shows in side view a soil compactor with a vibration generator according to the invention in a first indexing position;

FIGURE 2 a section along the line II—II of FIGURE 1;

FIGURE 3 the soil compactor with the vibration generator in a second indexing position;

FIGURE 4 the unbalances of FIGURE 3 after rotation through 90°;

FIGURE 5 a section along the line V—V of FIGURE 3;

FIGURE 6 a diagrammatic side elevation of a steerable soil compactor;

FIGURE 7 a plan view of the soil compactor of FIGURE 6 with the motor plate removed;

FIGURE 8 a section along the line VIII—VIII of FIGURE 6;

FIGURE 9 a section through a brake employed for the soil compactor according to the invention.

In FIGURE 1, the numeral 10 refers to a bottom plate on which a vibration generator 12 is mounted. The vibration generator 12 is provided with two shafts 14 and 16, (FIGURE 2) positioned parallel to each other in a horizontal plane. The shafts are journalled in rolling bearings 22 mounted in the intermediate walls 18 and 20 of the vibration generator housing. The shaft 14 has a pinion 24 keyed to it, said pinion having relatively large axial dimensions. Together with an asymmetrical mass distribution at 25, the pinion 24 also functions as one of the centrifugal weights. A further centrifugal weight 26 is keyed onto the end of the shaft 14, outside the intermediate wall 18. On the other side the shaft 14 is provided with two centrifugal weights 28 and 30 disposed on both sides of the intermediate wall. The pinion 24 meshes with a driving pinion 32 driven in suitable manner by the motor.

A pinion 34 is adapted to slide loosely and axially by means of a bearing 36 on the shaft 16. Said pinion 34 meshes with the pinion 24. It is provided on both sides with drivers 38, 40, disposed at an angle of approximately 180° relative to each other. Depending on the axial position of the pinion 34, said drivers 38, 40 bear on the abutments of stop members 42, 44 which are keyed to the shaft 16 on both sides of the pinion 34 and are formed in the present case by one centrifugal weight 42 or 44 respectively. Corresponding centrifugal weights 46, 48 are keyed to the ends of the shaft 16 and at a position outside the intermediate walls 18 or 20 respectively. The pinion 34 may be axially reciprocated by the pivoting of an indexing mechanism 50 which is not shown in detail. In the position illustrated in FIGURES 1 and 2, the driver 40 bears upon the centrifugal weight 44. Accordingly, the shaft 16, with the centrifugal weights 42, 44, 46, 48 mounted thereon is driven in the angular position illustrated in FIGURE 1 relative to the shaft 14 and to the centrifugal weights 25, 26, 28, 30, the drive being transmitted via the pinion 34 which in turn is driven by the pinion 24 mounted on the shaft 14. Accordingly, the shafts 14 and 16 counterrotate and the centrifugal weights mounted thereon produce vibrations orientated in the direction A indicated in FIGURE 1.

When the pinion 34 is moved by the mechanism 50 into the other limiting position as illustrated in FIGURE 5, the driver 40 will be detached from the centrifugal weight 44. At the same time, the driver 38 will enter the path of the abutment on the centrifugal weight 42. The shaft 16, which is not directly driven, will temporarily have no drive applied to it; the driver 40 is disengaged from the centrifugal weight 44 and the driver 38, offset relative to the other driver, is positioned 180° in the direction of rotation in front of the abutment on the centrifugal weight 42. The shaft 16 will therefore lag until the driver 38 bears upon the centrifugal weight 42. The centrifugal weights will then counter-rotate in the manner illustrated in FIGURES 3 and 4. FIGURE 3 shows the position in which the centrifugal forces of the counter-rotating unbalances just each other. FIGURE 4 illustrates a position of maximum resultant centrifugal force. It will be seen that vibrations orientated in the direction B occur after changeover. While a feed motion to the right takes place as illustrated in FIGURE 1, a feed motion to the left will result from the conditions illustrated in FIGURES 3 and 4.

A reliable changeover action is an essential prerequisite to ensure that the shaft 16 lags. However, self-synchronization of the centrifugal weights may occur if the system vibrates in resonance with the vibration generator 12. The vibrating motion causes the centrifugal weights on the shaft 16 to be "flung" around the shaft 16 and in synchronism with the vibrating motion without there being any direct transmissive coupling to the shaft 14. In this case the shaft 16 would therefore not lag after the pinion has been changed over and the described change of vibration orientation would not occur. Since feed control is obtained by variation of the vibration orientation it is possible for the self-synchronization described above to greatly impair the maneuverability of the soil compactor.

Accordingly, a brake disc 52 is mounted on the end of the shaft 16, a brake support 54 with brake linings being adapted to be pressed upon said brake disc by means of the brake operating disc 56. Operation of the brake 58 is coupled to the indexing mechanism 50, so that the brake 58 is automatically applied for a short period during each indexing motion. This ensures that the shaft 16, driven via the dog clutch, lags with reliability on each occasion until the driver once again bears on the associated abutment. The brake is of course out of action during normal operation.

FIGURES 6 to 8 illustrate a soil compactor in which two vibration generators of the kind illustrated in FIGURES 2 and 5 are disposed coaxially and adjacently in the feed direction in order to produce not only an optional forward and reverse feed motion but also a steering motion. To this end, the vibration orientations of the two aforementioned vibration generators can be individually changed over in the manner heretofore described. If the vibration orientation A or B of the vibration generator are selected (FIGURES 1 and 4), the soil compactor will move rectilinearly in the forward or reverse direction. However, if one vibration generator operates with the vibration orientation A while the other operates with the vibration orientation B, the soil compactor will traverse a right-hand or left-hand curve. The steering of soil compactors with a sole plate by means of two vibration generators having individually adjustable vibration orientations is known. However, the known systems involve relatively complex designs. However, in the application of dog clutches of the kind heretofore described which can be indexed in discrete steps, the essential feature is not only the avoidance of self-synchronization of an individual vibration generator but also synchronization of the right-hand vibration generator with the left-hand vibration generator or vice versa. This problem is solved in that the two shafts 16', 16", driven by the dog clutches, each have a brake 58' or 58" respectively (FIG. 8) which comes into operation during the changeover procedure.

The soil compactor according to FIGS. 6 to 8 is provided with a sole plate 62 having a pair of coaxially and adjacently disposed vibration generators 12' and 12", whose vibration orientations can be adjusted relative to each other. A motor plate 64 is supported via springs 66 on the sole plate 62. The motor plate 64 is provided with a motor 68 for driving the vibrator. For example, if the vibration generator 12' is set to the vibration orientation A and the vibration generator 12" is set to the vibration orientation B, the soil compactor will traverse a lefthand curve.

During the changeover operation the brakes 58' and 58" respectively ensure that the vibration generators can be changed into the aforementioned positions irrespective of the tendency of mutual synchronization.

A longitudinal section of a preferred embodiment of the brakes, being particularly unaffected by vibrations, is shown in FIGURE 9. The brake disc 52 is mounted on the shaft 16. The brake support 54 with the brake lining 70 is provided on the edge with sleeve eyelets 72 into which an anti-vibration ring mount 74 is fitted. The internal part of the anti-vibration ring mount 74 is tightened relative to the housing by means of a bolt 76 and a nut 78. Axial resilience of the anti-vibration ring mount 74 normally lifts the brake support 54 clear of the brake disc 52 so that the brake is released. The brake is applied by means of a brake operating disc 56 which is journalled by means of a rolling bearing 80 on the end of the shaft 16. The brake operating disc 56 is provided with blind holes 82 having springs 84 on which balls 86 thrust into tapered recesses 88 disposed on the rear side of the brake support 52. Rotation of the brake operating disc 56 into one or the other direction causes the brake support 54 to be pressed by the balls, which run on the inclined surfaces of the recesses 88, to be pressed upon the brake disc 52 against the spring biasing action of the anti-vibration ring mount 74.

The brake operating disc 56 is pivoted by means of an extension 90. A lever 92 which reciprocates with the changeover operation and is coupled to the mechanism 50 as indicated by dotted line 110 in FIGURES 5 and 9. The connection 110 is such that lever 92 pivots with the pivoting of indexing mechanism 50. Lever 92 has a roller 94 which bears upon the extension 90 when the said lever is in a middle position thus driving said extension for a certain distance which the brake operating disc 56 is rotated until the roller slides off the extension 90 and the brake operating disc returns into its starting position. During each indexing motion (to and fro) the brake is briefly applied once to ensure neat changeover by causing the shaft 16 to lag and the associated driver to bear upon the associated abutment of the centrifugal weights.

We claim:
1. In a directional vibrating apparatus, having variable vibration orientation, including a frame, two counter-rotating unbalances rotatably mounted on the frame, and driving means coupling one of said unbalances from the other of the unbalances and comprising a dog clutch engageable in a plurality of clutch positions separated from each other by definitive angular mounts whereby the angular position of said one unbalance with respect to the angular position of the other unbalance may be varied by, during an indexing operation, changing the engaged clutch positions from one to another, the improvement comprising:
brake means connected to said one unbalance for retarding the rotation of said one unbalance during an indexing operation.

2. In an apparatus as set forth in claim 1 having a clutch operating device, wherein said brake means comprises:
a brake disc rotatably secured to said one unbalance for rotation therewith about the rotational axis of the unbalance;
a brake operating disc mounted adjacent the brake disc for rotational movement about said axis;
a brake support secured to the frame against rotation and positioned in juxtaposition to said disc between the brake disc and the brake operating disc;
means on said disc and on said brake support and defining inclined surfaces positioned for forcing said brake support against said brake disc as said brake operating disc is rotated; and
means connected to said operating device and bearing against said brake operating disc to rotate said brake operating disc temporarily when said clutch operating device is actuated.

3. In an apparatus as set forth in claim 2, wherein
said brake operating disc has a lever projecting therefrom,
said means connected to said operating device comprising an extension pivotally mounted on the frame and bearing against one side of said lever, said extension being of a size to move past said lever after the extension has rotated the lever sufficiently to apply said brake to thereby permit the lever and operating disc to return to their original positions with the extension then on the opposite side of the lever.

References Cited

UNITED STATES PATENTS

| 2,542,227 | 2/1951 | Bernhard | 74—61 |
| 3,385,119 | 5/1968 | Berger | 74—61 |

MILTON KAUFMAN, Primary Examiner

U.S. Cl. X.R.

94—48

UNITED STATES PATENT OFFICE
CERTIFICATE OF CORRECTION

Patent No. 3,505,885　　　　　　　　　　Dated April 14, 1970

Inventor(s) Hans-Georg Waschulewski, et al.

It is certified that error appears in the above-identified patent and that said Letters Patent are hereby corrected as shown below:

Column 1, Line 19, "definite" should read --definitive--;

Column 1, Line 68, "refer" should read --refers--;

Column 2, Line 34, a comma should be inserted after --clutch--;

Column 3, Line 47, after "positioned" insert --approximately--;

Column 3, Line 54, after "just" insert -- compensate--;

Column 3, Line 71, after "not" insert --necessarily--;

Column 5, Line 11, "which" should be --while--;

Column 6, Line 6, after "said" insert --brake--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents